H. O. ADAM.
DEVICE FOR TRANSPORTING LOADS.
APPLICATION FILED JAN. 6, 1910.
982,654.
Patented Jan. 24, 1911.
3 SHEETS—SHEET 1.
Fig. 1
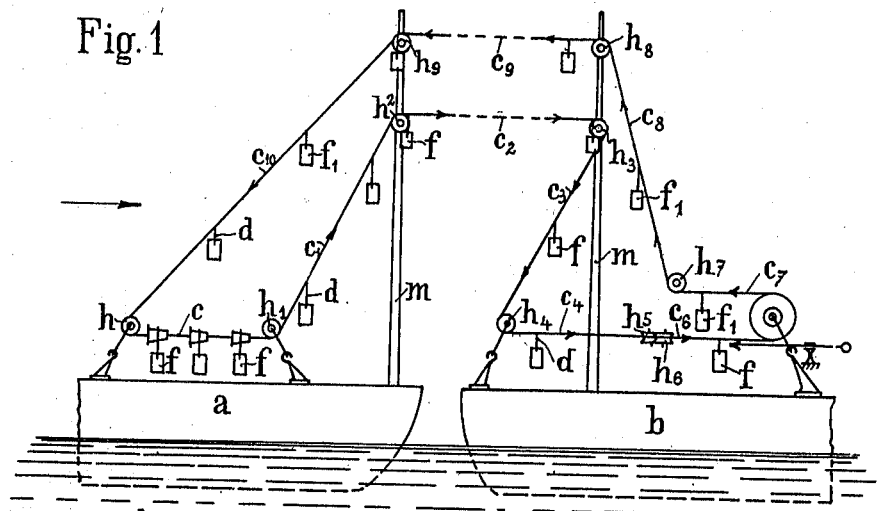
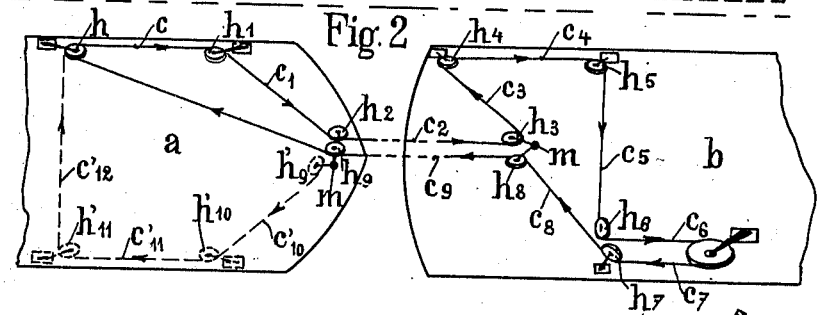
Fig. 4
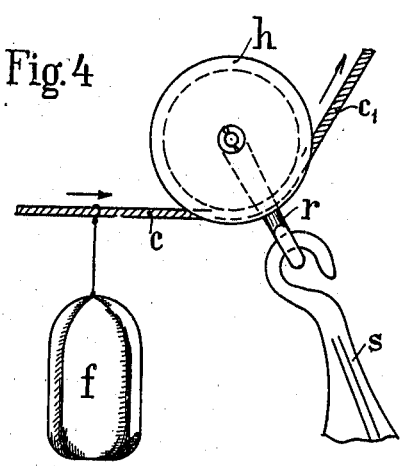
Fig. 5
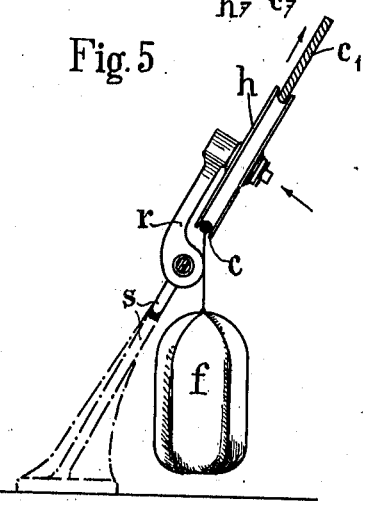
Witnesses:
W. R. Schulz
Arthur E. Zimpe
Inventor
Heinrich Otto Adam
by his attorney H. O. ADAM.
DEVICE FOR TRANSPORTING LOADS.
APPLICATION FILED JAN. 6, 1910.
982,654.
Patented Jan. 24, 1911.
3 SHEETS—SHEET 2.
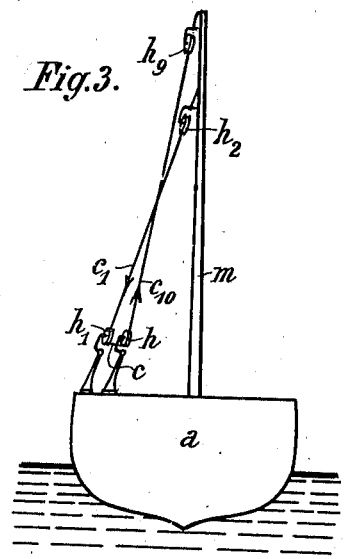
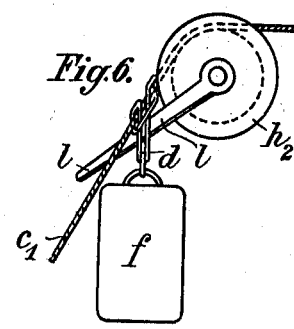
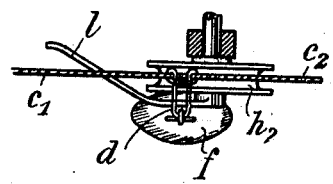
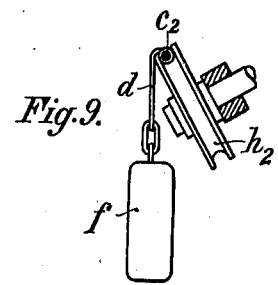
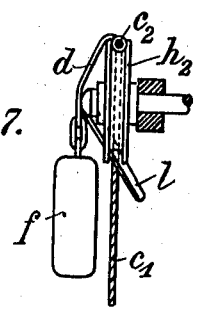
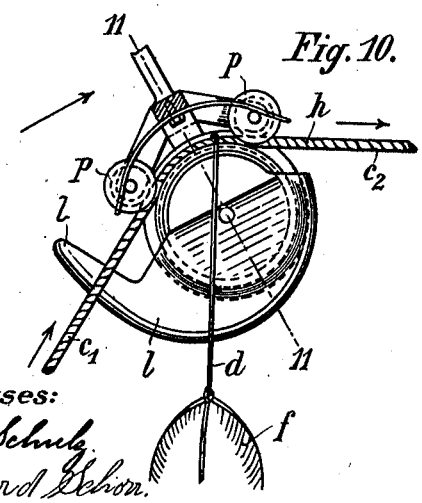
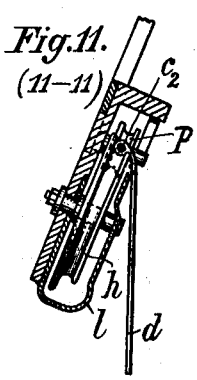
Witnesses:
Inventor.
Heinrich Otto Adam
by
Attorney.

H. O. ADAM.
DEVICE FOR TRANSPORTING LOADS.
APPLICATION FILED JAN. 6, 1910.
982,654.
Patented Jan. 24, 1911.
3 SHEETS—SHEET 3.
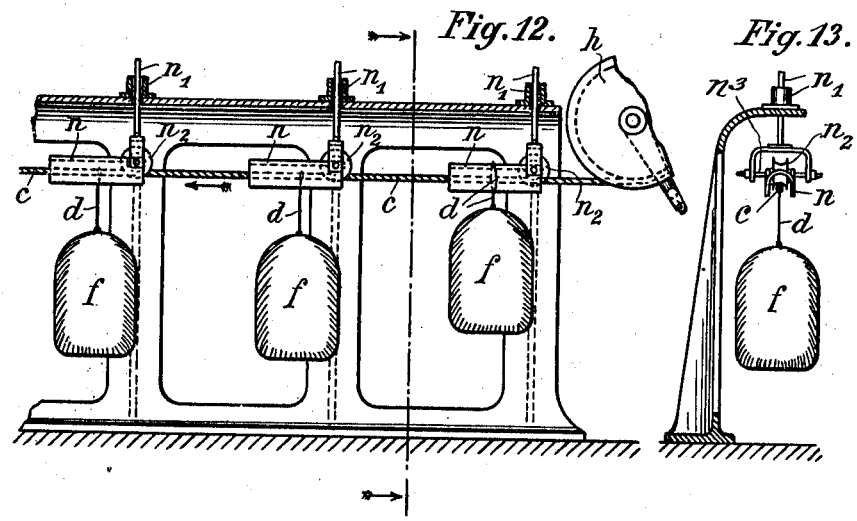
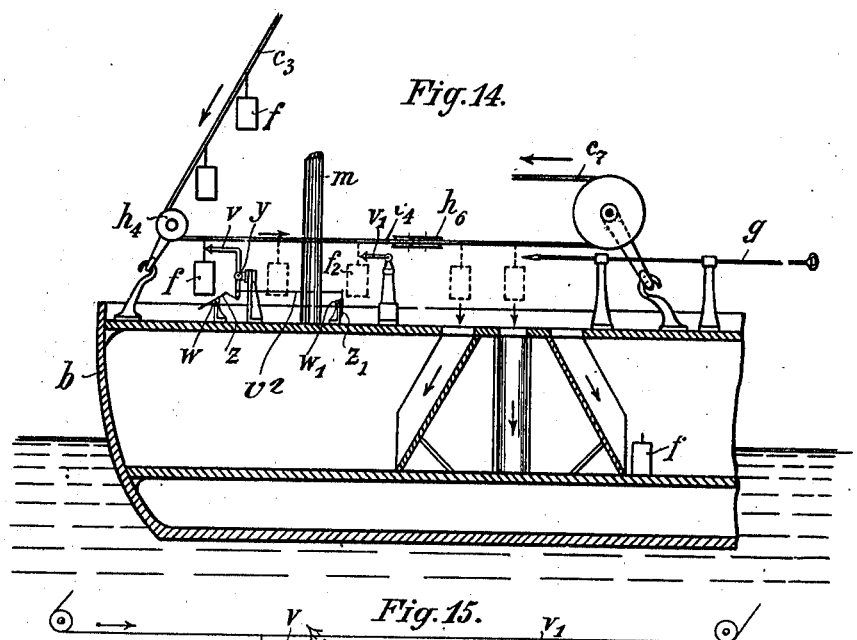
Witnesses:
W. A. Schulz.
Edward Schon.
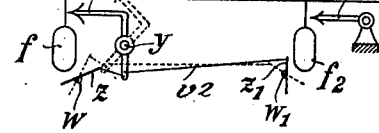
Inventor:
Heinrich Otto Adam
by
Attorney.

UNITED STATES PATENT OFFICE.

HEINRICH OTTO ADAM, OF DRESDEN, GERMANY.

DEVICE FOR TRANSPORTING LOADS.

982,654.  Specification of Letters Patent.  Patented Jan. 24, 1911.

Application filed January 6, 1910. Serial No. 536,690.

*To all whom it may concern:*

Be it known that I, HEINRICH OTTO ADAM, a citizen of the German Empire, residing at 37 Uhlandstrasse, Dresden, in the German Empire, have invented certain new and useful Improvements in Devices for Transporting Loads, of which the following is a specification, reference being had therein to the accompanying drawings.

This invention relates to an improvement in the apparatus for conveying loads especially suitable for use in coaling ships, described in my prior specification of Letters Patent of the United States No. 840,099. In the apparatus therein described there are employed, for the purpose of attaching the loads to the haulage-rope flexible supporting links, such for instance as slings, which are destroyed when the load arrives at its destination. In arrangements of this kind the conveyance of the loads takes place between a pair of pulleys.

With the present invention the rope carrying the slings may travel over or underneath any suitable number of pulleys without causing an undue twisting of the rope and without interfering with the loads depending from the slings. For this purpose, the pulleys are so pivoted to their supporting brackets that they adjust themselves automatically to the direction of the pull exercised by the rope, while suitable sling deflecting devices prevent any undue interference between the pulleys and the loads carried by the slings.

In the accompanying drawings: Figure 1 shows diagrammatically in elevation the arrangement of the pulleys for guiding the ropes when coal is to be conveyed from a transport ship to a man-of-war. Fig. 2 is a plan view of the arrangement shown in Fig. 1, and Fig. 3 is a transverse view of the same. Fig. 4 is a side view showing the method of suspending a rope pulley to oscillate; Fig. 5 is a front view of the same; Fig. 6 shows a device for deflecting the load when the sling carrying it passes over a pulley and Figs. 7 and 8 are respectively a side view and a plan of the deflecting device. Fig. 9 shows a modified form of carrying the invention into practice wherein a separate deflecting device is dispensed with; Fig. 10 shows a special form of deflecting device having in side elevation a horn-shaped projection; Fig. 11 is a front view of this arrangement showing at the same time the slight projection of the edge of the pulley; Figs. 12 and 13 show respectively in side and in front view a place at which the pulley mechanism is loaded; Fig. 14 shows diagrammatically the arrangement for taking off the loads by means of which unloading may be effected at various places; and Fig. 15 shows an arrangement of devices for destroying the slings at the points desired.

The drawings by no means exhaust the possibilities of this invention, which may be modified in any suitable manner without departing from the fundamental principle thereof.

In Fig. 1, $a$ indicates the transport and $b$ the man-of-war. Both ships are provided with masts or other suspension devices which carry the pulleys $h_2$, $h_3$, $h_8$ and $h_9$, other pulleys $h$, $h_1$, $h_4$, $h_5$ and $h_6$ being arranged in suitable positions, for instance on deck or in the hold. Over these pulleys there runs a haulage rope $c$, $c_1$, $c_2$ etc.; the loads to be conveyed from the transport $a$ to the man-of-war $b$ are indicated by $f$ while $f_1$ indicates the receptacles to be returned from $b$ to $a$. The loads $f$ and $f_1$ are attached to the rope mechanism by means of flexible carriers $d$, such for instance, as slings and the like.

Now the novelty of the present invention consists in the fact that the rope may be guided at an angle not only in a single plane, but in any number of planes inclined to each other, without the pulleys interfering with the loads and without the slings or the loads carried thereon being caused to wind themselves around the ropes in consequence of their rotation. To obtain this result, the pulleys, as is shown by way of example in Figs. 4 and 5, are suspended to oscillate in such manner that the groove for the rope may lie at any time in a plane determined by two portions of the rope, as for instance, by the portions $c$ and $c_1$.

In Fig. 4, $h$ is the pulley which is attached by means of the shackle $r$ to the hook $s$. The shackle $r$ may assume any position whatever in relation to the hook $s$ with the result that the pulley $h$ can also assume any position in relation to $s$ the position of this pulley at any moment being determined by the position of the portions $c$ and $c_1$ of the rope. This arrangement results in entirely eliminating all possibility of lateral friction between the rope and the edges of the pulley-groove together with the consequent rotation of the ropes during the working of the apparatus. As now the rope can be guided in any desired manner it can of course also be led for some distance horizontally over the deck and several loading devices can then be arranged on it adjacent to each other. For this purpose there are arranged behind each other a number of sleeves $n$ of the kind described in my aforesaid prior specification for the purpose of conveying the slings on to the rope. With the constructions hitherto employed, these sleeves were made removable with the object of facilitating the passage of the slings of the sleeves behind them. Such contrivances are however not only very complicated and likely to cause great waste of time, but they are also very dangerous as the remains of the slings that have been cut away and which are moving along with the rope-circuit, often cause the destruction of the body of the sling.

Now in accordance with the present invention the arrangement of several sleeves is rendered practicable by so constructing them that they do not entirely surround the rope but only partially embrace it either from above or from the side to which effect the sleeves are of semi-tubular shape open at the bottom. Such sleeves as shown in Figs. 12 and 13 are preferably movably suspended in such manner that the rope and the parts carrying the loads can always pass them freely.

In Figs 12 and 13, $n$ indicates the separate sleeves, $d$ are the slings and $f$ the sacks of coal. The sleeves $n$ are preferably guided by guides $n_1$ and may bear by means of pulleys $n_2$ on the rope $c$. The pulleys $n_2$, by being slidably mounted on spindles $n_3$, are capable of lateral movement if the rope should strike against them. Should it happen, in the constructions heretofore usual, that the slings should wind themselves around the rope, sleeves as heretofore constructed would on account of the apertures therein carry away the slings and the loads suspended thereon. But the present invention renders the rotation of the rope unobjectionable and therefore obviates this risk. The loading is effected by the flexible slings $d$ being placed upon several of the sleeves $n$ and then attached to the loads to be carried. After the loads have been secured in position the slings $d$ are pushed away from the sleeves and are carried along by the rope-circuit. The loads now, as shown in Fig. 1, are brought beneath the pulley $h_1$ of the transport $a$ and moved up to the level of the pulley $h_2$. The guidance of the slings, that is to say, of the loads carried thereon over the pulleys $h_2$ and $h_3$ involves very considerable difficulty. Such a pulley over which the sling carrying the load is to be guided, is therefore furnished with a deflecting device, the end of which, as shown in Figs. 6 to 8, projects beneath the conveying rope. When the sling $d$ with the load $f$ comes close to the deflecting device, both the sling and the load carried along by the rope $c$ will be turned sidewise and during the further rotation of the pulley will run in the groove thereof over the pulley in the manner shown by way of example in Figs. 7 and 8. As soon as the sling has passed over the pulley the load $f$ will again resume its vertical position. The lateral deflection of the load may however also be effected in such manner as to dispense with the deflecting device $l$, the pulley being caused to assume an oblique position as shown in Fig. 9 so that the load is suspended vertically upon the sling $d$ beyond the rim of the pulley and is kept by its weight out of contact with the pulley. But even when this arrangement is adopted it is advisable also to provide a deflecting device.

Figs. 10 and 11 illustrate a modified construction of deflecting device. In this case the lever arm $l$ is bent upward so as to form a horn and projects upwardly from beneath the rope. This arrangement has the great advantage that no matter how high the speed may be, the load cannot come in collision with the pulley. Fig. 11 illustrates moreover a further modification of the method of guiding the pulleys, according to which the pulley on the side on which the sling is suspended, has either no rim whatever or only a very low rim, an arrangement which affords great protection to the sling. To prevent the springing out of the rope from the groove of the pulley $h$ there are provided guide pulleys $p$ which are preferably connected with the pulley $h$ by means of a frame mounted to oscillate after the manner shown in Figs. 4 and 5, with the result that the rope pulley $h$ together with the guide-pulleys $p$ can assume any position suitable to the directions of the parts $c_1$ and $c_2$ of the rope $c$. By this means it is rendered possible to convey the loads suspended from the rope $c$ over the pulleys without incurring the risk that the slings with the loads thereto attached will be drawn into the pulleys or become heaped up in front of them.

Just as the possibility of guiding the ropes in any desired manner enables loads to be taken up at various places so in like manner it enables them to be put down at different points, their accumulation at any one point of the man-of-war being thus prevented. To this end there is arranged either beneath, or adjacent to, the hauling rope any suitable device for destroying the slings. This destroying device may be adjusted along the length of the rope-circuit $c$, being for instance movable in guides. Instead of employing one such device, which in that case must be movable, a number of such devices may be provided, these being put alternately into and out of action with the result that the loads are released at one time at the first, and at other times at the second or third positions, to be conveyed away by suitable chutes. Such an arrangement is shown in Fig. 15. After the load $f$ has been separated from the sling by the destroying device $v$ it will fall upon the plate $z$ pivoted at $w$ by which means the device $v$ is caused to rotate about the point $y$ with the result that the subsequent loads may pass by it and reach $v'$ where they are released. The load $f_2$ now falls upon the pivoted plate $z'$ which as it rotates about its pivot $w'$ causes by connecting rod $v_2$ the device $v$ again to assume its initial position. By this means the destroying devices $v$ and $v_1$ are employed alternately. Figs. 14 and 15 illustrate the knives $v$ and $v'$ diagrammatically and at right angles to the position which they actually occupy. In other words, the knives are made to swing in a horizontal plane on the vertical pivot $y$ so that by tilting them laterally, the knives will be swung into or out of the path of slings $d$. For the purpose of destroying the slings use may also be made of the variation of the direction of the hauling rope on a pulley or of the surface pressure in a groove. By varying the speed of the rope it is for instance possible so to increase the accelerating forces as to destroy either all the slings carried by the rope or a portion thereof. It is consequently also possible to effect the division of the loads when arriving on the man-of-war by adjusting for instance the speed of the rope in such manner as to enable a number of the slings to withstand the strain due to the accelerating forces, while another portion is destroyed. It is also possible to effect the division of the loads at the unloading places by making individual slings either stronger or weaker than the remainder so that at the weak spots described only the weak slings are destroyed, while the stronger ones are carried to the special destroying devices.

What I claim is:

1. A device of the character described, comprising a series of pulleys, means for so securing said pulleys to a ship that they are capable of universal movement, an endless rope engaging the pulleys, load-carrying slings suspended from the rope, means for deflecting said slings from the pulleys and semi-tubular loading sleeves straddling the rope.

2. A device of the character described, comprising a series of pulleys, means for so securing said pulleys to a ship that they are capable of universal movement, an endless rope engaging the pulleys, load-carrying slings suspended from the rope, means for deflecting said slings from the pulleys, semi-tubular loading sleeves straddling the rope and wheels slidably journaled to said sleeves and adapted to engage said rope.

3. A device of the character described, comprising a series of pulleys, means for so securing said pulleys to a ship that they are capable of universal movement, an endless rope engaging the pulleys, load-carrying slings suspended from the rope, means for deflecting said slings from the pulleys and means for successively removing the slings from the rope at alternate points.

4. A device of the character described, comprising a rope, slings suspended therefrom, a pair of consecutive cutters arranged in proximity to the slings, and means for so connecting the cutters, that when one cutter is operative, the other cutter is inoperative.

5. A device of the character described, comprising a series of pulleys, means for so securing said pulleys to a ship that they are capable of universal movement, an endless rope engaging the pulleys, flexible load carriers suspended from the rope, and an open-bottomed loading device arranged in proximity to the rope and forming a clearance for the flexible carriers.

6. A device of the character described, comprising a series of pulleys, means for so securing said pulleys to a ship that they are capable of universal movement, an endless untwisted rope engaging the pulleys, flexible carriers depending from the rope, and means for deflecting said carriers when passing a pulley, said means consisting of arms, which project upwardly from beneath the rope.

In testimony whereof I affix my signature in the presence of two witnesses.

HEINRICH OTTO ADAM.

Witnesses:
　PAUL ARRAS,
　CLÄRE SIMON.